June 5, 1923.
R. C. FULTON
AUTOMATICALLY OPERATED ROAD MAP FOR MOTOR VEHICLES
Filed April 18, 1922
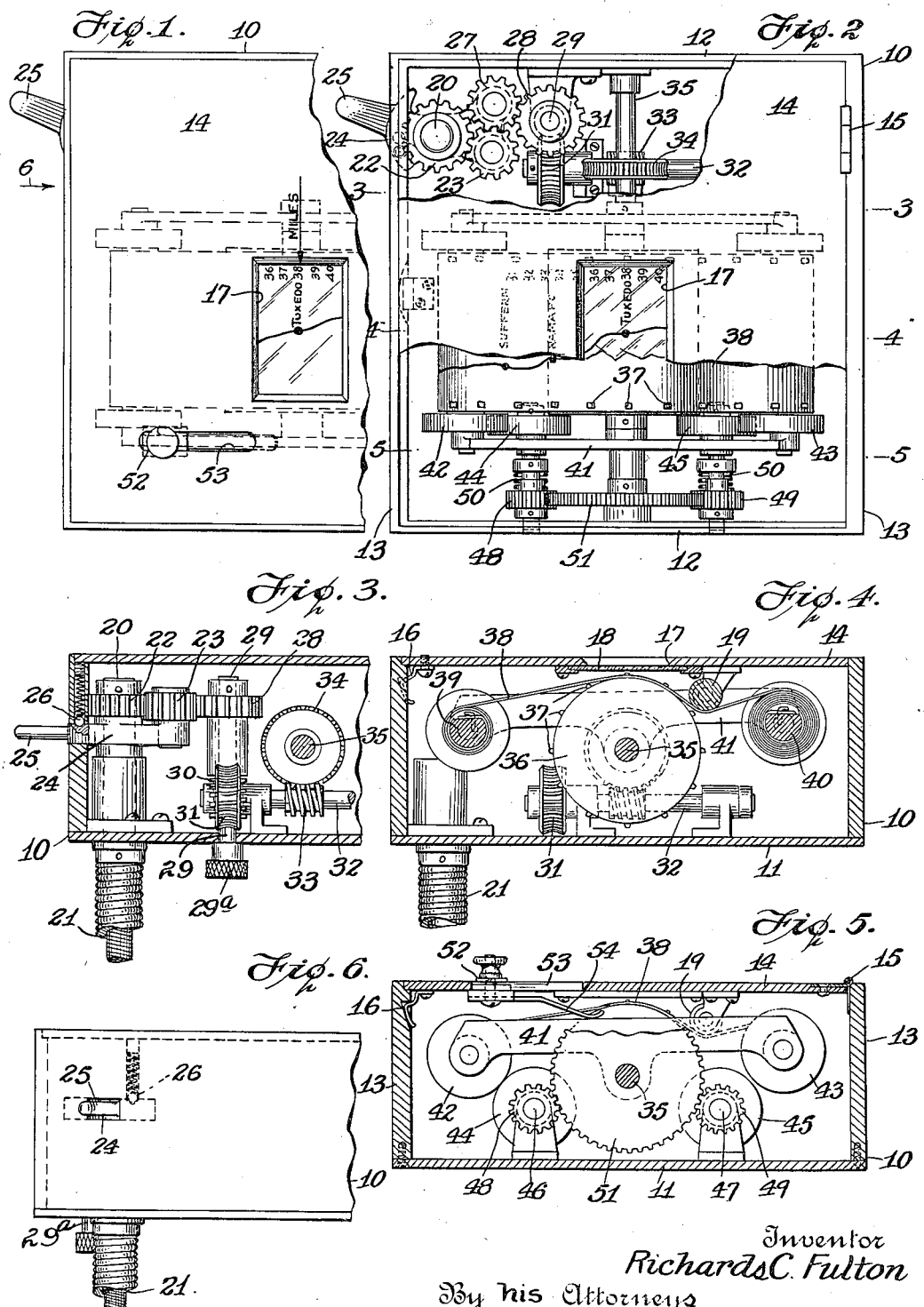
Inventor
Richards C. Fulton
By his Attorneys
Edgar Date &C.

Patented June 5, 1923.

1,457,358

UNITED STATES PATENT OFFICE.

RICHARDS C. FULTON, OF WHITE PLAINS, NEW YORK.

AUTOMATICALLY-OPERATED ROAD MAP FOR MOTOR VEHICLES.

Application filed April 18, 1922. Serial No. 555,038.

*To all whom it may concern:*

Be it known that RICHARDS C. FULTON, a citizen of the United States, and residing at White Plains, in the county of Westchester and State of New York, has invented certain new and useful Improvements in Automatically-Operated Road Maps for Motor Vehicles, of which the following is a specification, such as will enable those skilled in the art to which it appertains to make and use the same.

This invention relates to devices or apparatus for use in connection with motor vehicles and in connection with which a road map is adapted to be mounted and automatically operated in the progress of the vehicle and so positioned on the vehicle as to be readily seen at all times by the operator or chauffeur whereby a predetermined tour may be taken with accurate guidance by said device or apparatus; and the object of the invention is to provide an apparatus of the class and for the purpose specified with which predetermined road maps or charts may be detachably connected, with means for automatically operating said charts in the progress of the vehicle; a further object being to provide means for governing the direction in which the map or chart is moved; and with these and other objects in view the invention consists in an apparatus of the class and for the purpose specified which is simple in construction and operation and efficient in use and which is constructed and operated as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a part of my improved apparatus;

Fig. 2 a view similar to Fig. 1 showing the complete apparatus with parts of the construction broken away;

Fig. 3 a partial section on the line 3—3 of Fig. 2;

Fig. 4 a partial section on the line 4—4 of Fig. 2;

Fig. 5 a partial section on the line 5—5 of Fig. 2; and,

Fig. 6 an end view of the apparatus looking in the direction of the arrow 6 of Fig. 1, with part of the construction broken away.

In practice, I provide a suitable box-shaped casing 10 comprising a bottom 11, the side walls 12 and end walls 13. The top of the casing is open and closed by a hinged door 14 hinged to one of the end walls 13 as shown at 15 and held in a closed position by a spring catch device 16 cooperating with the other end wall 13 of the casing, or a recess formed therein as shown in Fig. 5. The door 14 is provided approximately centrally thereof with a rectangular aperture 17 closed by a transparent panel 18, and mounted in connection with and carried by the door 14 is a roller 19 as clearly shown in Fig. 4 of the drawing.

Mounted in one corner portion of the casing 10 is a drive shaft 20 which is adapted to be operated by a flexible shaft 21 coupled therewith in any desired manner, said flexible shaft extending through the bottom 11 of the casing and being in operative connection with one of the wheels of the vehicle in the usual manner or in the manner of a speedometer mechanism. Secured to the shaft 20 is a gear 22 which meshes with a gear 23 mounted in connection with a lever 24 rotatably mounted on the shaft 20 and provided with a handpiece 25 which extends through one of the end walls 13 of the casing, said lever being adapted to be retained in different positions of adjustment by a spring pressed ball 26 engaging either one of two recesses in the lever 24 as illustrated in Figs. 3 and 6 of the drawing. The lever 24 also carries another gear 27 which meshes with the gear 23, but which is out of mesh with the gear 20 as clearly shown in Fig. 2 of the drawing, and by moving the lever 24 either one of the gears 23 and 27 may be brought into engagement with a gear 28 mounted upon a vertical shaft 29 in the casing 10.

Secured to the lower end portion of the shaft 29 is a worm 30 adapted to mesh with the worm gear 31 mounted upon a horizontal shaft 32. The shaft 32 is provided with a worm 33 adapted to mesh with a worm gear 34 mounted upon a shaft 35 located centrally and horizontally of the casing and extending from one side wall 12 to the other, as clearly shown in Fig. 2 of the drawing.

Secured to the shaft 35 approximately centrally between the side walls 12 is a drum 36 provided on the periphery thereof and adjacent to the ends thereof with spaced projecting teeth 37 adapted to engage similarly spaced perforations in a road map strip or film 38, as clearly shown in Figs. 2 and 4 of the drawing. The film 38 is mounted upon spools 39 and 40 mounted in the free ends of rocker arms 41, the spools 39 and 40 or the shafts thereof are provided at one end with friction drive wheels 42 and 43 which are adapted to be moved into engagement with similar friction wheels 44 and 45 mounted upon stub shafts 46 and 47, as clearly shown in Fig. 5, and pinions 48 and 49 are tensionally coupled with the shafts 46 and 47 through tensional clutch devices 50 shown in Fig. 2 of the drawing, and said pinions are adapted to mesh with a gear 51 mounted upon the shaft 35 at one side of the drum 36.

Adjustably mounted in connection with the cover 14 of the casing is a controlling device 52 which is adapted to move longitudinally of an elongated aperture 53 in said cover, and comprises a spring arm 54 which cooperates with one of the rocker arms 41 to depress the end portions thereof to move and tensionally hold either one of the friction wheels 42 and 43 in engagement with the friction wheels 44 and 45.

It will be understood that in the use of my improvement, the casing 10 will be preferably mounted in connection with the usual dashboard of a motor vehicle in the manner of mounting a speedometer register in connection with such vehicle, and the flexible drive shaft 21 will extend to one of the wheels of a vehicle and be suitably geared in connection therewith, and the ratio of gearing between such wheel and the drum 36 through the two sets of worm drives of the casing 10 and the other gearing therein will cause said drum to be rotated one revolution to a predetermined number of miles traveled by the vehicle, that is to say in one revolution of the drum 36 the vehicle may travel five, ten, fifteen or more miles, and as the drum is rotated, the road map or film 38 will be fed by said drum beneath the aperture 17 from one spool to the other in which operation the map or film is held in firm engagement with the drum by the roller 19. As this operation continues the desired directions of a complete tour will appear in the aperture 17 and the operator will be constantly informed or posted.

It will be understood that the drum 36 is constantly driven, while the vehicle is in progress by the flexible shaft 21 through the gears 22, 23, 27, 28, 30, 31, 33, and 34, and the friction drive rollers 44 and 45 are operated through the gear 51 and pinions 48 and 49 to cause one of the spools, the spool 39, to be driven through the friction wheel 42 in the construction as shown in the accompanying drawing. It will be apparent, however, that the lever 24 may be operated to drive the drum in the reverse direction through the gears 22, 23 and 28, and the spool 40 may be operated by moving the device 52 longitudinally of the slot 53 in the cover 14 to depress the opposite side of the rocker arm 41 to bring the friction wheel 43 into engagement with the friction drive wheel 45.

The resilient clutch 50 between the shaft 46 and 47 and pinions 48 and 49 is to permit of the slippage or free action of the friction drive rollers 42—44, 43—45.

It will be understood that any desired road map may be mounted in connection with the casing by opening the cover 14 thereof and mounting said map on the spools 39 and 40, or by providing removable spools if desired, which is a common practice in various kinds and classes of apparatus employing spools, reels and films mounted thereon.

It will also be apparent that while I have shown certain details of construction for carrying my invention into effect that I am not necessarily limited to these details, and various changes therein and modifications thereof may be made, within the scope of the appended claims, without departing from the spirit of my invention or sacrificing its advantages.

The lever 24 may also be placed in a neutral position with the gears 23 and 27 out of engagement with the gear 28 and it will be noted that the shaft 29 upon which the gear 28 is mounted extends through the bottom of the casing is provided with a milled nut 29$^a$ as shown in Fig. 3 of the drawing, and by means of which, when the lever 24 is in a neutral position, the map strip 38 may be wound upon either of the spools for the purpose of resetting said strip in the event of tours or for any other purposes.

Having fully described my invention, what I claim as new and desire to secure by Letters Patent, is:—

1. A device of the class described comprising a suitable casing, a drive shaft in said casing, means involving a flexible shaft in operative connection with a rotatable member of a vehicle for rotating said drive shaft, a drum mounted in said casing in juxtaposition to an aperture therein, rotatable members adapted to support a road map in said casing in such position as to cooperate with said drum and the aperture of said casing, a lever mounted upon said drive shaft and provided with a plurality of gears geared in connection with said drive shaft and a predetermined number of said gears being adapted to operate in connection with a supplemental drive gear in said casing, a plurality of worm gearings in operative connection with said last named gear, and one of said worm gearings being in operative connection with said drum whereby the rotation of the drive shaft will rotate said drum in a predetermined direction.

2. A device of the class described comprising a suitable casing, a drive shaft in said casing, means involving a flexible shaft in operative connection with a rotatable member of a vehicle for rotating said drive shaft, a drum mounted in said casing in juxtaposition to an aperture therein, rotatable members adapted to support a road map in said casing in such position as to cooperate with said drum and the aperture of said casing, a lever mounted upon said drive shaft and provided with a plurality of gears geared in connection with said drive shaft and a predetermined number of said gears being adapted to operate in connection with a supplemental drive gear in said casing, a plurality of worm gearings in operative connection with said last named gear and one of said worm gearings being in operative connection with said drum whereby the rotation of the drive shaft will rotate said drum in a predetermined direction, and means involving other gears for operating said rotatable members.

3. A device of the class described comprising a suitable casing, a drive shaft in said casing, means involving a flexible shaft in operative connection with a rotatable member of a vehicle for rotating said drive shaft, a drum mounted in said casing in juxtaposition to an aperture therein, rotatable members adapted to support a road map in said casing in such position as to cooperate with said drum and the aperture of said casing, a lever mounted upon said drive shaft and provided with a plurality of gears geared in connection with said drive shaft and a predetermined number of said gears being adapted to operate in connection with a supplemental drive gear in said casing, a plurality of worm gearings in operative connection with said last named gear, one of said worm gearings being in operative connection with said drum whereby the rotation of the drive shaft will rotate said drum in a predetermined direction, means involving other gears for operating said rotatable members, and means for controlling the operation of said members.

4. A device of the class described comprising a suitable casing, a drive shaft in said casing, means involving a flexible shaft in operative connection with a rotatable member of a vehicle for rotating said drive shaft, a drum mounted in said casing in juxtaposition to an aperture therein, rotatable members adapted to support a road map in said casing in such position as to cooperate with said drum and the aperture of said casing, a lever mounted upon said drive shaft and provided with a plurality of gears geared in connection with said drive shaft and a predetermined number of said gears being adapted to operate in connection with a supplemental drive gear in said casing, a plurality of worm gearings in operative connection with said last named gear, one of said worm gearings being in operative connection with said drum whereby the rotation of the drive shaft will rotate said drum in a predetermined direction, means involving other gears for operating said rotatable members, means for controlling the operation of said members, and means for placing said lever and the gears thereof in a neutral position.

5. A device of the class described comprising a suitable casing, a drive shaft in said casing, means involving a flexible shaft in operative connection with a rotatable member of a vehicle for rotating said drive shaft, a drum mounted in said casing in juxtaposition to an aperture therein, rotatable members adapted to support a road map in said casing in such position as to cooperate with said drum and the aperture of said casing, a lever mounted upon said drive shaft and provided with a plurality of gears geared in connection with said drive shaft and a predetermined number of said gears being adapted to operate in connection with a supplemental drive gear in said casing, a plurality of worm gearings in operative connection with said last named gear, one of said worm gearings being in operative connection with said drum whereby the rotation of the drive shaft will rotate said drum in a predetermined direction, means involving other gears for operating said rotatable members, means for controlling the operation of said members, means for placing said lever and the gears thereof in a neutral position, and means exposed through the casing for manually operating said rotatable members.

6. An automatically operated touring guide device for motor vehicles, comprising a suitable casing, means for detachably and movably mounting a tour designating element in said casing, said element being adapted to be passed over and moved by a drum and being visible through the casing, a shaft mounted in the casing and driven by a rotatable member of a vehicle, a lever rotatably mounted on said shaft and carrying a plurality of gears adapted to mesh with and be driven by a gear on said shaft, and means involving other gears mounted in the casing for driving said drum through the gears on said lever.

7. An automatically operated touring guide device for motor vehicles, comprising a suitable casing, means for detachably and movably mounting a tour designating element in said casing, said element being adapted to be passed over and moved by a drum and being visible through the casing, a shaft mounted in the casing and driven by a rotatable member of a vehicle, a lever rotatably mounted on said shaft and carrying a plurality of gears adapted to mesh with and be driven by a gear on said shaft, means involving other gears mounted in the casing for driving said drum through the gears on said lever, and said lever being exposed through the casing and manually operated to move the gears thereof into different positions.

8. An automatically operated touring guide device for motor vehicles, comprising a suitable casing, means for detachably and movably mounting a tour designating element in said casing, said element being adapted to be passed over and moved by a drum and being visible through the casing, a shaft mounted in the casing and driven by a rotatable member of a vehicle, a lever rotatably mounted on said shaft and carrying a plurality of gears adapted to mesh with and be driven by a gear on said shaft, means involving other gears mounted in the casing for driving said drum through the gears on said lever, said lever being exposed through the casing and manually operated to move the gears thereof into different positions, and said last named means being in operative connection with the tour designating element supporting means.

9. An automatically operated touring guide device for motor vehicles, comprising a suitable casing, means for detachably mounting a tour designating element in said casing, said element being adapted to be passed over and moved by a drum and being visible through the casing, a shaft mounted in the casing and driven by a rotatable member of a vehicle, a gear on said shaft within the casing, a lever rotatable on said shaft and carrying a plurality of gears, one of which is adapted to mesh with the gear on said shaft, said lever being exposed through the casing and adapted to be manually operated, other gears and driving members mounted in the casing and adapted to be driven by the gears of said lever, and said last named gears and members being in operative connection with said drum and the tour designating element supporting means.

10. An automatically operated touring guide device for motor vehicles, comprising a suitable casing, means for detachably mounting a tour designating element in said casing, said element being adapted to be passed over and moved by a drum and being visible through the casing, a shaft mounted in the casing and driven by a rotatable member of a vehicle, a gear on said shaft within the casing, a lever rotatable on said shaft and carrying a plurality of gears, one of which is adapted to mesh with the gear on said shaft, said lever being exposed through the casing and adapted to be manually operated, other gears and driving members mounted in the casing and adapted to be driven by the gears of said lever, said last named gears and members being in operative connection with said drum and the tour designating element supporting means, and means adjustably mounted in the casing and cooperating with said supporting means for controlling the operation thereof.

11. An automatically operated touring guide device for motor vehicles, comprising a suitable casing, means for detachably mounting a tour designating element in said casing, said element being adapted to be passed over and moved by a drum and being visible through the casing, a shaft mounted in the casing and driven by a rotatable member of a vehicle, a gear on said shaft within the casing, a lever rotatable on said shaft and carrying a plurality of gears, one of which is adapted to mesh with the gear on said shaft, said lever being exposed through the casing and adapted to be manually operated, other gears and driving members mounted in the casing and adapted to be driven by the gears of said lever, said last named gears and members being in operative connection with said drum and the tour designating element supporting means, means adjustably mounted in the casing and cooperating with said supporting means for controlling the operation thereof, the gears of said lever being adapted to be moved into neutral position, and means exposed through the casing for manually operating said tour designating element through the gears and members of the casing.

12. An automatically operated touring guide device for motor vehicles, comprising a suitable casing, means for detachably mounting a tour designating element in said casing, said element being adapted to be passed over and moved by a drum and being visible through the casing, a shaft mounted in the casing and driven by a rotatable member of a vehicle, a gear on said shaft within the casing, a lever rotatable on said shaft and carrying a plurality of gears, one of which is adapted to mesh with the gear on said shaft, said lever being exposed through the casing and adapted to be manually operated, another shaft mounted in the casing and provided with a gear in connection with which the gears of said lever are adapted to mesh, and means involving worm gears in operative connection with said last named shaft for rotating said drum.

13. An automatically operated touring guide device for motor vehicles, comprising a suitable casing, means for detachably mounting a tour designating element in said casing, said element being adapted to be passed over and moved by a drum and being visible through the casing, a shaft mounted in the casing and driven by a rotatable member of a vehicle, a gear on said shaft within the casing, a lever rotatable on said shaft and carrying a plurality of gears, one of which is adapted to mesh with the gear on said shaft, said lever being exposed through the casing and adapted to be manually operated, another shaft mounted in the casing and provided with a gear in connection with which the gears of said lever are adapted to mesh, means involving worm gears in operative connection with said last named shaft for rotating said drum, and frictional means in operative connection with the drum for operating the tour designating element supporting means.

14. An automatically operated touring guide device for motor vehicles, comprising a suitable casing, means for detachably mounting a tour designating element in said casing, said element being adapted to be passed over and moved by a drum and being visible through the casing, a shaft mounted in the casing and driven by a rotatable member of a vehicle, a gear on said shaft within the casing, a lever rotatable on said shaft and carrying a plurality of gears, one of which is adapted to mesh with the gear on said shaft, said lever being exposed through the casing and adapted to be manually operated, another shaft mounted in the casing and provided with a gear in connection with which the gears of said lever are adapted to mesh, means involving worm gears in operative connection with said last named shaft for rotating said drum, frictional means in operative connection with the drum for operating the tour designating element supporting means, and means movably mounted in the casing for moving said supporting means into different positions and for holding the same in such positions.

15. An automatically operated touring guide device for motor vehicles, comprising a suitable casing, means for detachably mounting a tour designating element in said casing, said element being adapted to be passed over and moved by a drum and being visible through the casing, a shaft mounted in the casing and driven by a rotatable member of a vehicle, a gear on said shaft within the casing, a lever rotatable on said shaft and carrying a plurality of gears, one of which is adapted to mesh with the gear on shaft, said lever being exposed through the casing and adapted to be manually operated, another shaft mounted in the casing and provided with a gear in connection with which the gears of said lever are adapted to mesh, means involving worm gears in operative connection with said last named shaft for rotating said drum, frictional means in operative connection with the drum for operating the tour designating element supporting means, means movably mounted in the casing for moving said supporting means into different positions and for holding the same in such positions, and said last named shaft being exposed through the casing and adapted to be manually operated at will.

16. An automatically operated touring guide device for motor vehicles, comprising a suitable casing, a drum mounted in the casing, means involving a plurality of gears in said casing and a flexible shaft adapted to be driven by a rotatable member of the vehicle for rotating said drum in predetermined directions, members movably mounted upon the axis of said drum at the opposite ends thereof, means for detachably securing a tour designating element with said members, and frictional means in said casing operated by said drum for moving said element in predetermined directions.

17. An automatically operated touring guide device for motor vehicles, comprising a suitable casing, a drum mounted in the casing, means involving a plurality of gears in said casing and a flexible shaft adapted to be driven by a rotatable member of the vehicle for rotating said drum in predetermined directions, members movably mounted upon the axis of said drum at the opposite ends thereof, means for detachably securing a tour designating element with said members, frictional means in said casing operated by said drum for moving said element in predetermined directions, and means adjustably mounted in the casing and cooperating with said members for controlling the direction of movement of said element through said frictional means.

In testimony that I claim the foregoing as my invention I have signed my name this 15th day of April 1922.

RICHARDS C. FULTON.